United States Patent
Dewey et al.

(10) Patent No.: US 8,812,443 B2
(45) Date of Patent: Aug. 19, 2014

(54) FAILURE DATA COLLECTION SYSTEM APPARATUS AND METHOD

(75) Inventors: Douglas William Dewey, Tucson, AZ (US); Brian David Hatfield, Tucson, AZ (US); Ivan Ronald Olguin, II, Tucson, AZ (US); William Griswold Sherman, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1214 days.

(21) Appl. No.: 11/865,559

(22) Filed: Oct. 1, 2007

(65) Prior Publication Data

US 2009/0089336 A1 Apr. 2, 2009

(51) Int. Cl.
*G06F 11/07* (2006.01)
*G06F 17/30* (2006.01)

(52) U.S. Cl.
CPC ........ *G06F 11/0778* (2013.01); *G06F 11/0727* (2013.01)
USPC ........................................... 707/642

(58) Field of Classification Search
CPC .................. G06F 17/30088; G06F 17/30138; G06F 11/00778
USPC .......... 707/609, 640, E17.007, 649, E17.005, 707/E17.01, E17.09, E17.107, 639, 645, 707/676, 679, 692, 704, 738, 740, 822, 707/642; 714/E11.025, E11.026, E11.029, 714/E11.169, 33, 37, 49, 57, 719; 709/220, 709/224; 715/786; 717/127
See application file for complete search history.

(56) References Cited

U.S. PATENT DOCUMENTS

| | | | |
|---|---|---|---|
| 5,287,496 A | 2/1994 | Chen et al. | 395/600 |
| 5,581,749 A * | 12/1996 | Hossain et al. | 1/1 |
| 5,682,523 A * | 10/1997 | Chen et al. | 711/3 |
| 6,150,679 A * | 11/2000 | Reynolds | 257/213 |
| 6,792,518 B2 | 9/2004 | Armangau et al. | 711/162 |
| 6,848,106 B1 | 1/2005 | Hipp | |
| 7,062,677 B1 * | 6/2006 | Chigurupati | 714/25 |
| 2003/0220948 A1 * | 11/2003 | Green et al. | 707/204 |
| 2004/0015740 A1 | 1/2004 | Dautelle | 714/37 |
| 2005/0055603 A1 | 3/2005 | Soran et al. | 714/7 |
| 2006/0036655 A1 * | 2/2006 | Lastovica | 707/203 |
| 2006/0047926 A1 | 3/2006 | Zheng | 711/162 |
| 2011/0276842 A1 * | 11/2011 | Shibamori et al. | 714/49 |

FOREIGN PATENT DOCUMENTS

| | | | |
|---|---|---|---|
| JP | 02047735 A | | 2/1990 |
| JP | 05134906 A | | 6/1993 |
| JP | 05189254 A | | 7/1993 |
| JP | 05210608 A | | 8/1993 |
| JP | 2002073585 A | | 3/2002 |
| JP | 2007193414 A | | 8/2007 |
| JP | 2007523404 A | | 8/2007 |

OTHER PUBLICATIONS

Dubois, LL, et al. "Dumping the DFT Data Segment", IBM Technical Disclosure Bulletin, vol. 32, No. 8B, Jan. 1990, p. 193.

* cited by examiner

*Primary Examiner* — Jacob F Bétit
*Assistant Examiner* — Amanda Willis
(74) *Attorney, Agent, or Firm* — Kunzler Law Group (57) ABSTRACT

An apparatus for collecting dump data collection receives an on demand data (ODD) dump request, pauses one or more scan loops, transfers dump data to an ODD dump buffer space, unpauses the scan loops, and offloads dump data from the ODD dump buffer space to the storage device. The apparatus may also prioritize dump data for transfer to the ODD dump buffer space, load balance dump data for transfer to the ODD dump buffer space, and schedule offloading of the dump data from the ODD dump buffer space to non-volatile storage.

20 Claims, 6 Drawing Sheets

FAILURE DATA COLLECTION SYSTEM APPARATUS AND METHOD

BACKGROUND OF THE INVENTION

1. Field of the Invention

This invention relates to systems, apparatus, and methods for recovering data and more particularly relates to systems, apparatus, and methods for collecting dump data.

2. Description of the Related Art

Dump data often includes data located in the volatile memory of a digital system (such as a storage controller) at the time of a processing error or failure. Dump data is valuable when assessing the performance of a digital system. Dump data may be directly associated with the performance of one or more hardware and/or software components of the digital system. Though the value of dump data is clear, current solutions to collecting dump data include certain shortcomings.

For example, many dump data collection solutions include inconveniently restarting the digital system commonly referred to as a warmstart. A warmstart is effective to collect dump data because a warmstart suspends operation of scan loops also referred to as event loops or work dispatchers to ensure the volatile memory data is not altered before it can be collected. In addition to requiring time, warmstarting a digital device often results in a storage controller busy signal being transmitted to an associated host computer which suspends system operations. Suspending system operations is more severe in systems that include multiple host computers, storage controllers, and storage devices.

SUMMARY OF THE INVENTION

The present invention has been developed in response to the present state of the art, and in particular, in response to the problems and needs in the art that have not yet been fully solved by currently available failure data collection solutions. Accordingly, the present invention has been developed to provide an apparatus, system, and method for collecting dump data.

In one aspect of the present invention, a dump data collection system includes one or more host computers that communicate with storage controllers that in turn communicate with storage devices. Each storage controller may receive an on demand data (ODD) dump request, pause one or more storage controller scan loops, transfer dump data to an ODD dump buffer space, unpause the scan loops, and offload the dump data from the ODD dump buffer space to the storage devices.

In another aspect of the present invention, a dump data collection apparatus includes a communication module that receives an on demand data (ODD) dump request, a scan loop management module that pauses one or more scan loops in response to the ODD dump request, and a dump data transfer module that transfers dump data to an ODD dump buffer space. The scan loop management module may also unpause the scan loops to enable the scan loops to resume normal operation, and the dump data transfer module may offload the dump data from the ODD dump buffer space to storage.

In certain embodiments, the scan loop management module may pause one or more scan loops, initiate a scan loop pause timer, attempt to pause any remaining scan loops before expiration of the scan loop pause timer, and unpause all scan loops if all scan loops are not paused before expiration of the scan loop pause timer. In certain embodiments, the scan loop management module may also reattempt to pause all scan loops and reinitiate the scan loop pause timer upon expiration of a reset timer.

In certain embodiments, the apparatus also includes a dump data prioritization module that prioritizes dump data before dump data is transferred to the ODD dump buffer space. In certain embodiments, the dump data prioritization module is further configured to register and deregister perspective dump data in real-time to facilitate dump data prioritization. In certain embodiments, the apparatus includes a load balance module that load balances dump data amongst multiple processing threads that simultaneously transfer dump data to distinct segments of the ODD dump buffer space.

In certain embodiments, the dump data transfer module also transfers dump data to the ODD dump buffer space until expiration of a dump data transfer timer. In certain embodiments, the scan loop management module also restarts the scan loops to normal processing in spite of an incomplete data dump. In certain embodiments, the apparatus includes an offload schedule module that schedules the offloading of the dump data from the ODD dump buffer space to storage so as to maximize performance.

A method of the present invention is also presented for collecting dump data. The method in the disclosed embodiments substantially includes the operations necessary to carry out the functions presented above with respect to the described system and apparatus. In one embodiment, the method includes receiving an on demand data (ODD) dump request, pausing one or more scan loops, transferring dump data to an ODD dump buffer space, unpausing the scan loops, and offloading dump data from the ODD dump buffer space to storage.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, among different processors, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

A computer readable medium may be embodied by a compact disk, digital-video disk, a magnetic tape, a Bernoulli drive, a magnetic disk, holographic disk or tape, a punch card, flash memory, magnetoresistive memory, integrated circuits, or other digital processing apparatus memory device.

Furthermore, the described features, structures, or characteristics of the invention may be combined in any suitable manner in one or more embodiments. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
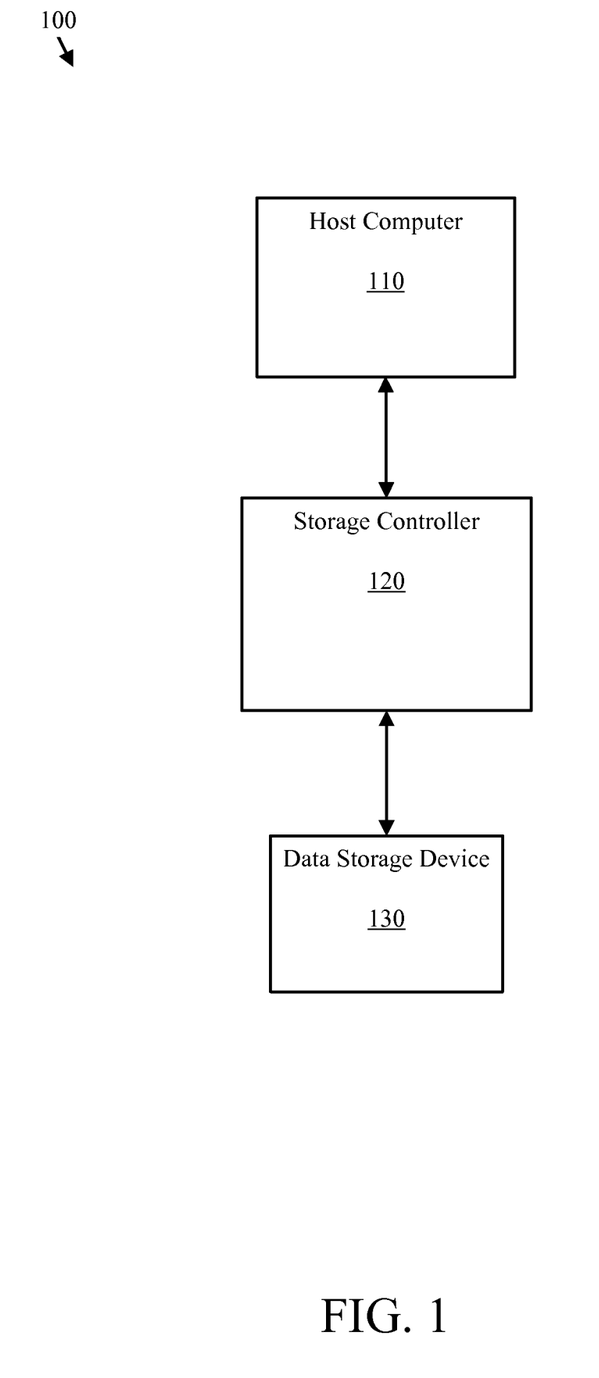
FIG. 1 is a schematic block diagram of one embodiment of a dump data collection system in accordance with the present invention.

FIG. 1 is a schematic block diagram of one embodiment of a dump data collection system 100 in accordance with the present invention. The depicted system 100 includes a host computer 110, a storage controller 120, and a data storage device 130. The components of the system 100 cooperate to collect dump data.

In certain embodiments, the host computer 110 communicates and executes input/output operations corresponding to the storage device 130 via the storage controller 120. In certain embodiments, the storage controller 120 receives an on demand data (ODD) dump request. In response to the ODD dump request, the storage controller 120 may pause any storage controller scan loops to ensure that data in the nonvolatile memory of the storage controller 120 is not altered.

In certain embodiments, the storage controller 120 transfers dump data to an ODD dump buffer space (see FIG. 2) so that the scan loops may be unpaused to perform normal operations. The storage controller 120 may offload the dump data from the ODD dump buffer space to the storage device 130 for long-term storage and analysis. As such, the components of the storage controller 200 cooperate to collect and store dump data without substantially reducing the performance of normal storage controller processes.

Figure 2:
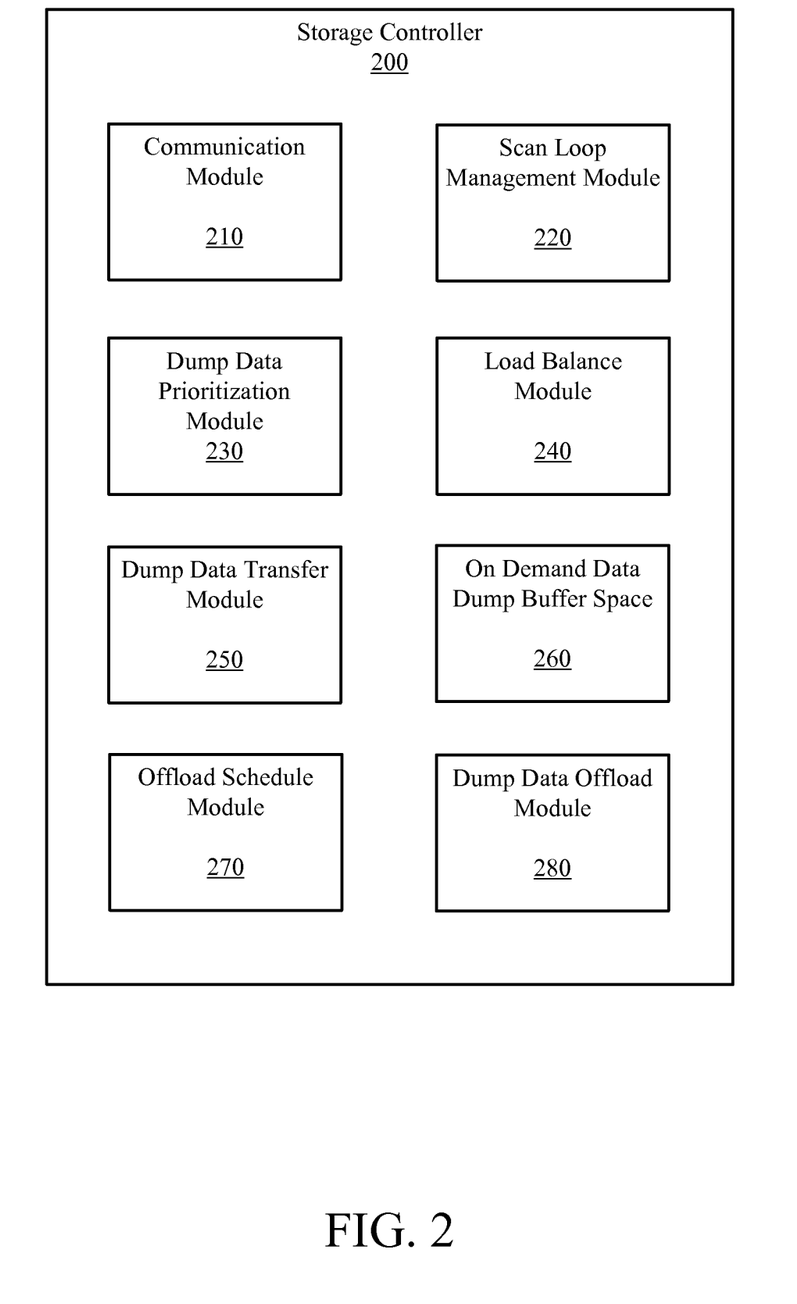
FIG. 2 is a schematic block diagram of one embodiment of a storage controller in accordance with the present invention.

FIG. 2 is a schematic block diagram of one embodiment of a storage controller 200 in accordance with the present invention. The depicted storage controller 200 includes a communication module 210, a scan loop management module 220, a dump data prioritization module 230, a load balance module 240, a dump data transfer module 250, an on demand data dump buffer space 260, an offload schedule module 270, and a dump data offload module 280. In certain embodiments, the storage controller 200 corresponds to the storage controller 120 of FIG. 1.

Figure 4:
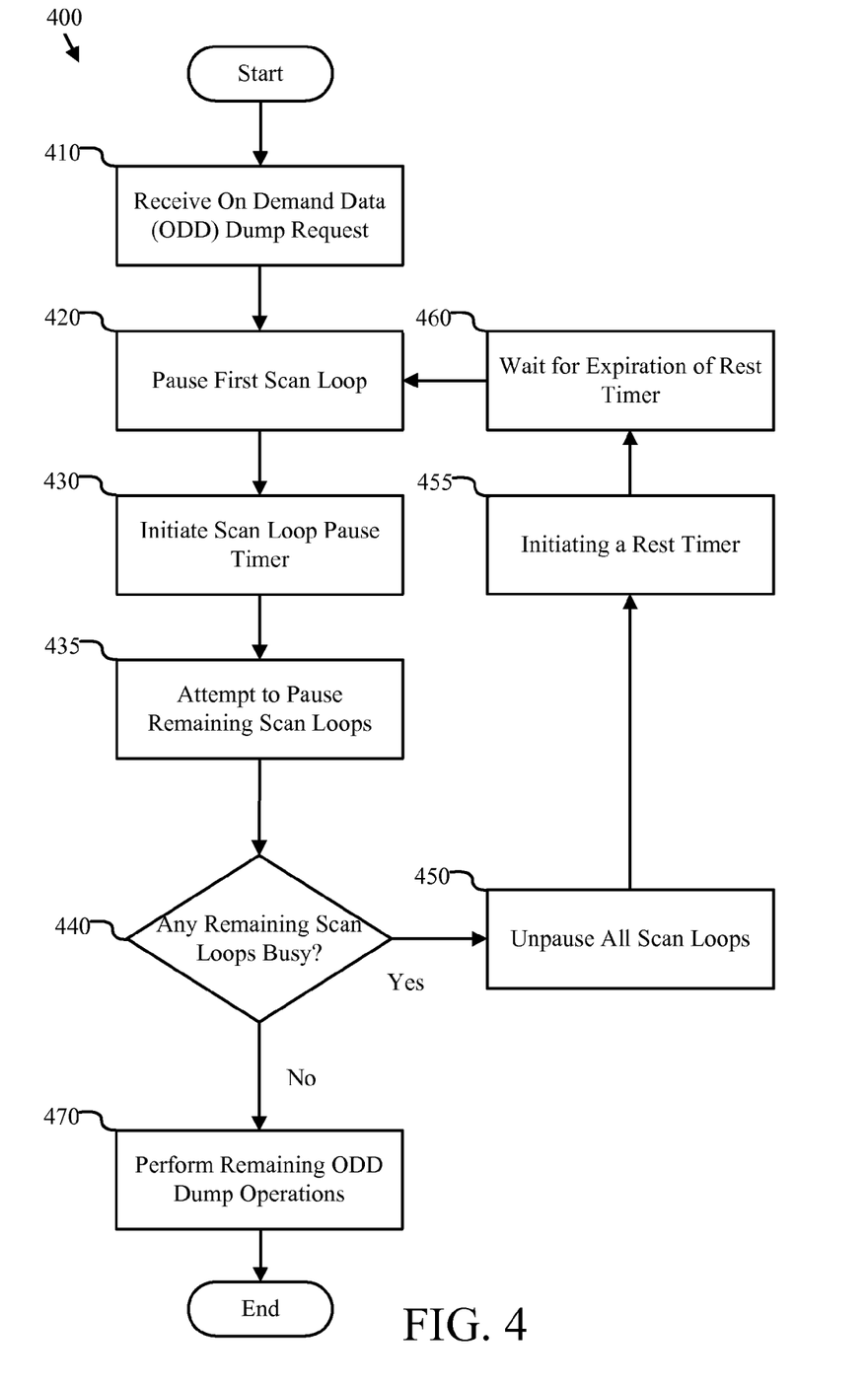
FIG. 4 is flow chart diagram of one embodiment of a method to pause one or more scan loops in accordance with the present invention.

In certain embodiments, the communication module 210 receives an ODD dump request. The ODD dump request may originate from a variety of sources such as a user/operator, the host computer 110, a companion storage controller (see FIG. 6), or it may be triggered by selected internal circumstances detected by the storage controller 120. In response to the ODD dump request, the scan loop module 220 may pause any scan loops operating within the storage controller to preserve the integrity of the dump data. The description of FIG. 4 provides additional discussion regarding pausing scan loops. In certain embodiments, the dump data may include any or all of the data located in volatile memory of the storage controller 200 at the time of the ODD dump request.

Figure 5:
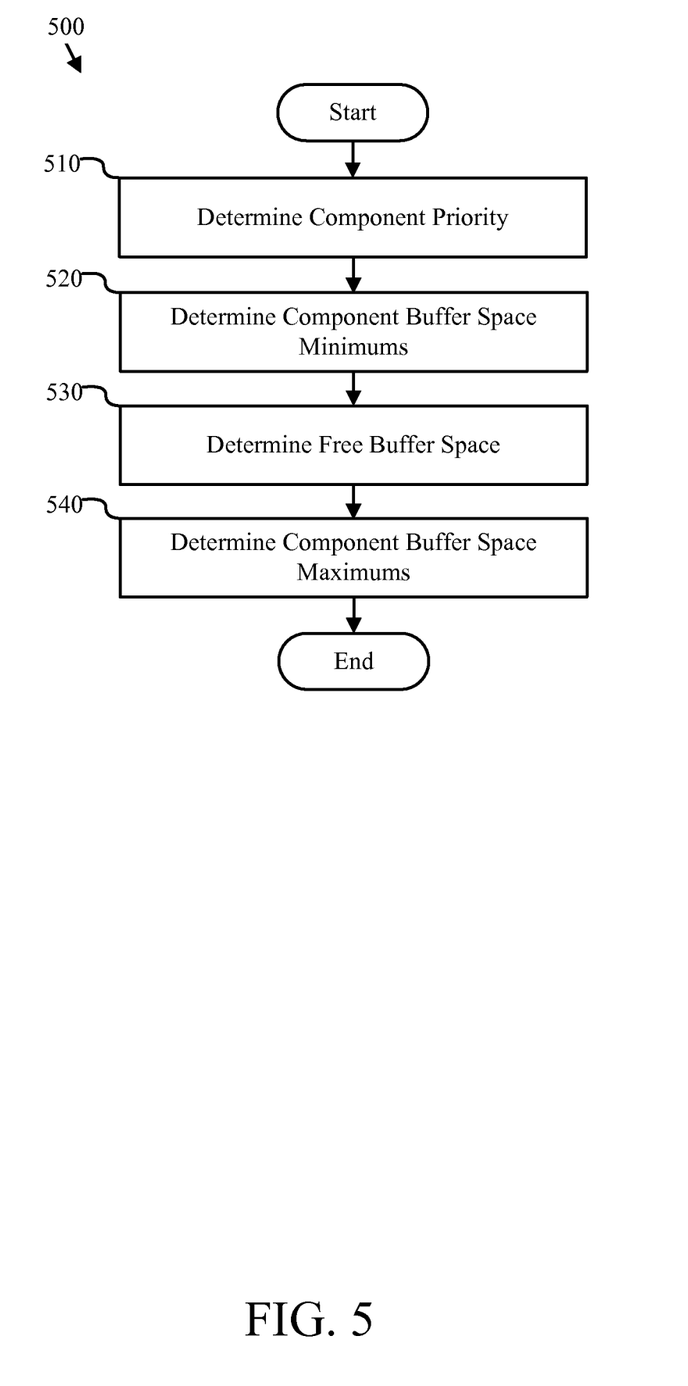
FIG. 5 is flow chart diagram of one embodiment of a method to prioritize dump data in accordance with the present invention.

In certain embodiments, the dump data prioritization module 230 prioritizes the dump data. Prioritizing dump data ensures that the dump data of the highest priority is transferred to the ODD dump buffer space 260 first. The description of FIG. 5 provides additional details of dump data prioritization. The load balance module 240 may balance the dump data to be transferred to the ODD dump buffer space 260 amongst multiple processing threads to maximize an efficient transfer of dump data to the ODD dump buffer space 260. The dump data transfer module 250 may transfer the dump data to the ODD dump buffer space 260. In certain embodiments, the dump data transfer module 250 transfers dump data to the ODD dump buffer space 260 until the expiration of a dump data transfer timer to ensure that the scan loops are not paused for an undesirably long period of time.

The ODD dump buffer space 260 may include a selected volume of volatile memory for temporarily storing dump data. The scan loop management module 220 may unpause and/or restart the scan loops to enable the scan loops to resume normal operations because the dump data has been transferred to the ODD dump buffer space 260. Providing an ODD dump buffer space 260 enables an efficient relocation to temporary store dump data and ensures that the dump data may be transferred to non-volatile storage without alteration by the dump data offload module 280. The offload schedule module 270 may schedule the transfer of the dump data to storage with minimal burden to the performance of the storage controller 200. As such, the present invention provides an efficient solution to performing an on demand data (ODD) dump.

Figure 3:
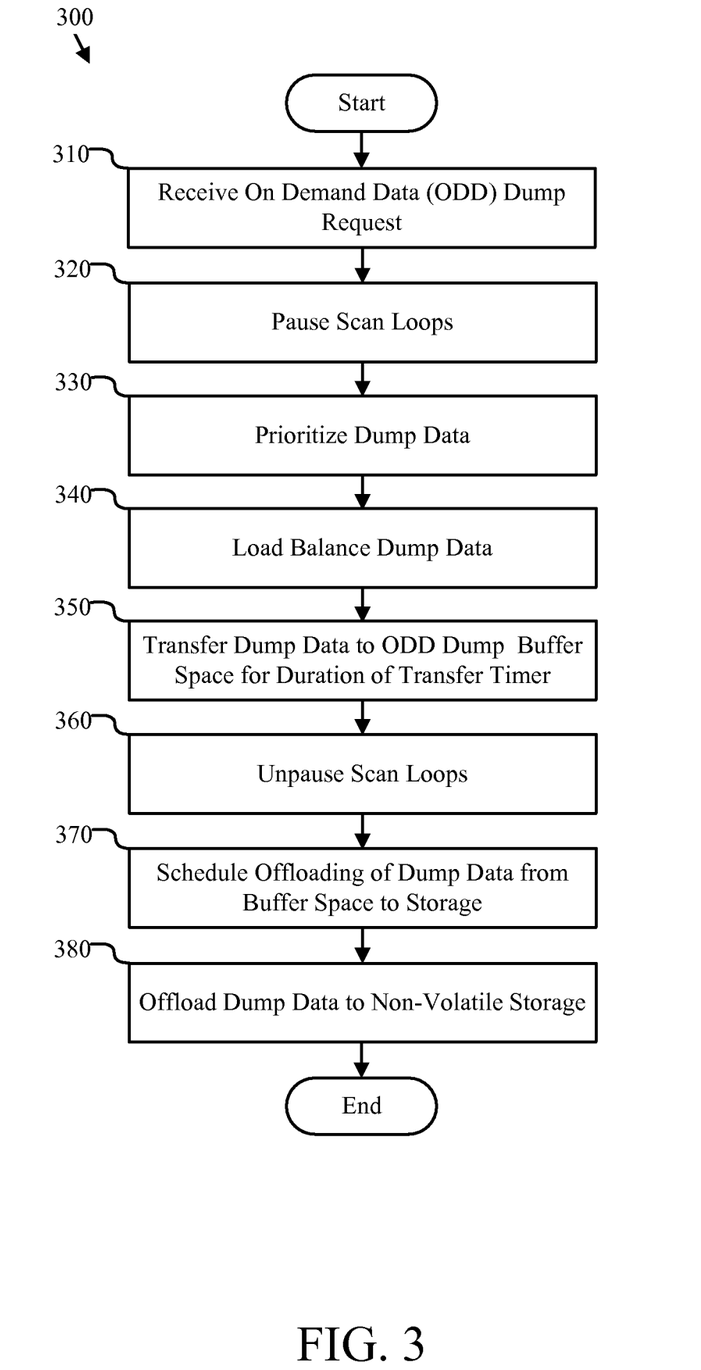
FIG. 3 is flow chart diagram of one embodiment of a dump data collection method in accordance with the present invention.

FIG. 3 is flow chart diagram of one embodiment of a dump data collection method 300 in accordance with the present invention. The depicted method 300 includes the operations of receiving 310 an ODD dump request, pausing 320 scan loops, prioritizing 330 dump data, load balancing 340 dump data, transferring 350 dump data to an ODD dump buffer space, unpausing 360 scan loops, scheduling 370 the offload of dump data, and offloading 380 the dump data. The operations of the method 300 cooperate to efficiently collect dump data to a non-volatile storage volume.

Receiving 310 an ODD dump request may include receiving an ODD dump request from a host computer or storage controller operator. Pausing 320 scan loops may include pausing one or more scan loops associated with a storage controller so that the data located in volatile memory is not altered. Prioritizing 330 dump data may include prioritizing data in a volatile memory volume according to selected prioritization instructions to ensure that the data of the highest priority is transferred to an ODD dump buffer space first. Load balancing 340 dump data may include balancing the dump data to be transferred to the ODD dump buffer space amongst any or all of the processing threads to maximize efficient data transfer.

Transferring 350 dump data to an ODD dump buffer space may include transferring the dump data from a volatile memory volume specified for more general use to a selected volatile memory volume specified to operate as a dump data buffer, for the duration of a dump data transfer timer. In certain embodiments, providing a dump data transfer timer ensures that the storage controller will be returned to normal operating conditions within an acceptable period of time.

Unpausing 360 the scan loops may include enabling the scan loops to restart or resume normal operations. Scheduling 370 offload of dump data from the buffer space to storage may include scheduling an offload of the dump data within normal input/output operations of the storage controller so little or no effect of the performance of the storage controller. Offloading 380 dump data may include transferring the dump data from the ODD dump buffer space to a non-volatile storage volume for storage.

FIG. 4 is flow chart diagram of one embodiment of a method 400 to pause one or more scan loops in accordance with the present invention. The depicted method 400 includes the operations of receiving 410 an ODD dump request, pausing 420 a first scan loop, initiating 430 a scan loop pause timer, attempting 435 to pause any remaining scan loops, determining 440 whether any of the remaining scan loops are busy, unpausing 450 all scan loops, initiating 455 a rest timer, waiting 460 for the expiration of a rest timer, and performing 470 any remaining ODD dump operations. The operations of the method 400 provide one solution of pausing a plurality of scan loops.

Receiving 410 an ODD dump request may include receiving an ODD dump request from a host computer, an operator, or a storage controller. Pausing 420 a first scan loop may include pausing the scan loop that process reception of the ODD dump request. Initiating 430 a scan loop pause timer may include initiating a timer for attempting to pause the remaining scan loops. A scan loop pause timer ensures that the system will not unsuccessfully attempt to pause the remaining scan loops for an undesirably long period of time.

Attempting 435 to pause remaining scan loops may include instructing any other scan loops to discontinue processing input/output requests so as to maintain the integrity of the dump data in volatile memory.

Determining 440 whether any remaining scan loops are busy may include determining whether the attempt to pause the remaining scan loops was successful upon the expiration of the scan loop pause timer initiated by operation 435. Assuming that at least one of the remaining scan loops is busy (possibly because the scan loop is processing an instruction of higher priority), unpausing 450 all the scan loops to enable the paused scan loops to normal resume input/output operations.

Initiating 455 a rest timer and waiting 460 for the expiration of the rest timer may include allowing the scan loops to perform normal input/output operations for a given period of time before reattempting to pause the first scan loop and so on. Once all the scan loops are successfully paused, the method 400 continues by performing 470 remaining ODD dump operations as described in FIG. 3. As such, the present invention provides a solution for a pausing a plurality of scan loops to preserve dump data in the volatile memory.

FIG. 5 is flow chart diagram of one embodiment of a method 500 to prioritize dump data in accordance with the present invention. The depicted method 500 includes the operations of determining 510 component priority, determining 520 component buffer space minimums, determining 530 free buffer space, and determining 540 component buffer space maximums. The operations of the method 500 provide one example of a solution for prioritizing dump data for transfer to an ODD dump buffer space.

Determining 510 component priority may include receiving component priority instructions from a user/operator. In certain embodiments, priority instructions may include how one component is prioritized with respect to another and how dump data corresponding to each component should be prioritized. In certain embodiments, an operator may register or deregister priority information corresponding to perspective dump data in real-time to facilitate data prioritization which enables developers to focus on different types of dump data through the development cycle.

Determining 520 component buffer space minimums may include determining whether any component has been assigned more buffer space than is necessary. Determining 530 free buffer space may include determining the buffer space already allocated to the component buffer space minimums. Free buffer space may be dynamically allocated to another component upon transferring the dump data to the ODD dump buffer space, according to component priority. Determining 540 component buffer space maximums may include determining the maximum amount of buffer space that each component may use to ensure that the component with the highest priority is not allocated all of the free buffer space.

As such, when dump data is transferred to the ODD dump buffer space, the data may be transferred according to the priority determined by operation 510, first with respect to component buffer space minimums and then to the free buffer space in accordance with the component priority order and the component buffer space maximums. One of skill in the art will appreciate that, in certain embodiments, this more general prioritization method 500 may be altered depending upon the source of the ODD dump request, type of ODD dump request (user-specified test cases), or the type of operations that were being performed by the storage controller.

Figure 6:
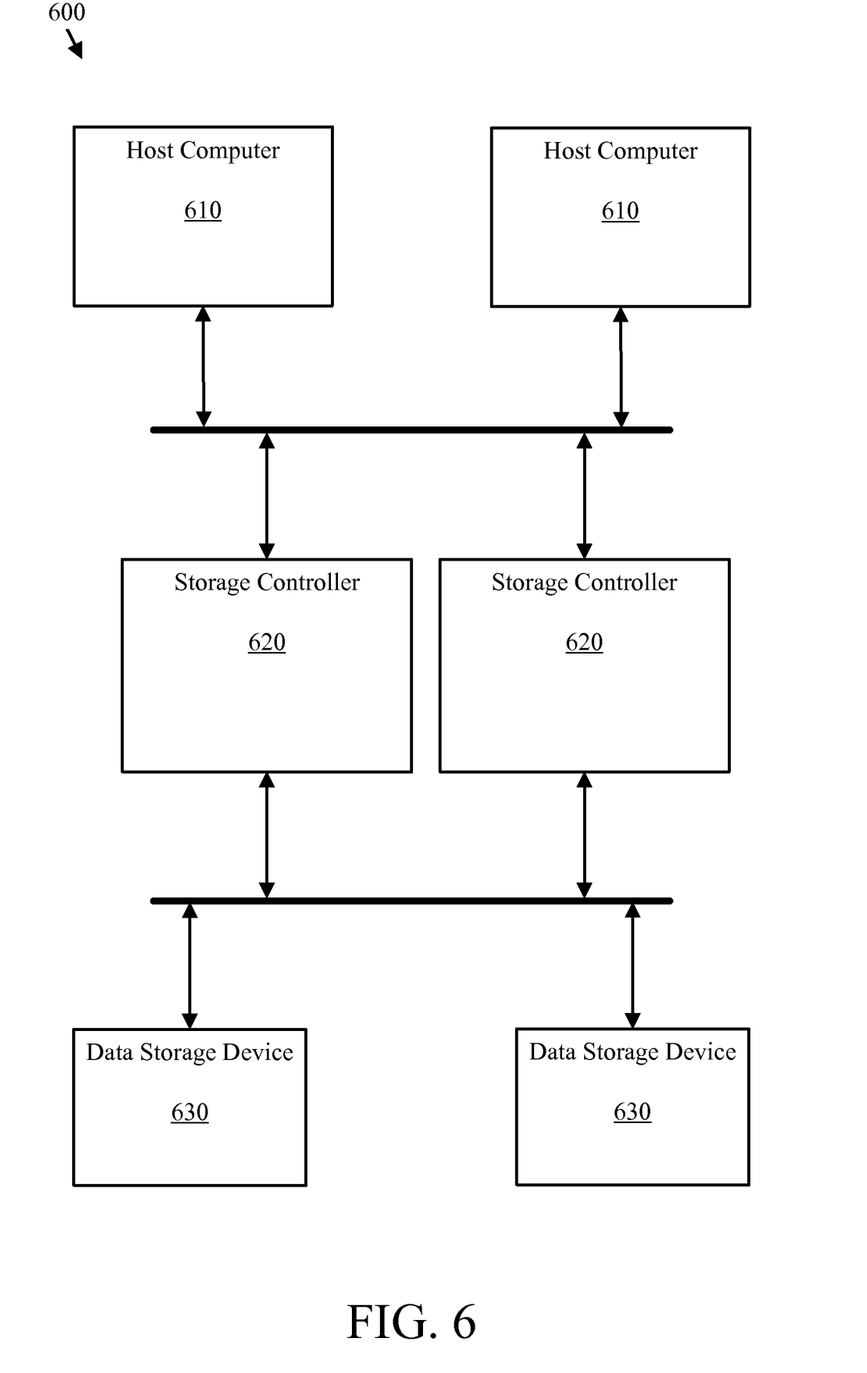
FIG. 6 is a schematic block diagram of one embodiment of a dump data collection system in accordance with the present invention.

FIG. 6 is a schematic block diagram of one embodiment of a dump data collection system 600 in accordance with the present invention. The depicted system 600 includes host computers 610, storage controllers 620, and data storage devices 630. The system 600 provides one solution for multiple host computers 610, multiple storage controllers 620, and multiple storage devices 630 that may respectively correspond to the host computer 110, storage controller 120, and storage device 130 of FIG. 1.

The host computers 610 may communicate with the storage controller 620 and thereby execute input/output operations with respect to the data storage devices 630. The storage controllers 620 may receive an ODD dump request from the host computers 610, an operator/user, or a storage controller 620. Similarly, the storage controllers may store collected dump data in either of the data storage devices 630. In this manner, the present invention may be implemented with multiple components and over a local or distributed network.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for collecting dump data, the apparatus comprising:
   a computer readable medium storing machine-readable instructions;
   a processor executing the machine-readable instructions, the machine-readable instructions comprising:
   a communication module receiving an on demand data (ODD) dump request from a host to transfer dump data from a storage controller memory of a storage controller distinct from the host, wherein the storage controller comprises at least two components and the ODD dump request comprises a component priority for each component;
   a scan loop management module pausing at least one scan loop performed by the storage controller on the storage controller memory in response to receiving the ODD dump request;
   a dump data transfer module allocating free buffer space within an ODD dump buffer space for each component according to the component priority by determining a component buffer space minimum and a component buffer space maximum for each component, wherein the component buffer space minimum comprises previously allocated buffer space and the component buffer space maximum is less than all free buffer space, transferring the dump data from the storage controller memory to the ODD dump buffer space according to the component priority, and upon transferring the dump data for a first component, dynamically allocating free buffer space from the first component with a higher priority to a second component with a lower priority;
   the scan loop management module further unpausing the at least one scan loop in response to the transfer of the dump data to the ODD dump buffer space; and
   a dump data offload module offloading the dump data from the ODD dump buffer space to a data storage device distinct from the host and the storage controller.

2. The apparatus of claim 1, the scan loop management module further pausing the at least one scan loop, initiating a scan loop pause timer, attempting to pause any remaining scan loops before expiration of the scan loop pause timer, and unpausing all scan loops if all scan loops are not paused before expiration of the scan loop pause timer.

3. The apparatus of claim 2, the scan loop management module further reattempting to pause all scan loops and reinitiating the scan loop pause timer upon expiration of a rest timer.

4. The apparatus of claim 1, further comprising a dump data prioritization module prioritizing dump data before dump data is transferred to the ODD dump buffer space.

5. The apparatus of claim 4, the dump data prioritization module further registering and deregistering perspective dump data in real-time to facilitate dump data prioritization.

6. The apparatus of claim 1, further comprising a load balance module balancing dump data amongst multiple processing threads that simultaneously transfer the dump data to distinct segments of the ODD dump buffer space.

7. The apparatus of claim 1, the dump data transfer module further transferring the dump data to the ODD dump buffer space until expiration of a dump data transfer timer.

8. The apparatus of claim 7, the scan loop management module further restarting the at least one scan loop to normal processing in spite of an incomplete data dump.

9. The apparatus of claim 1, further comprising an offload scheduling module scheduling offloading of the dump data from the ODD dump buffer space to storage.

10. A non-transitory computer readable medium tangibly embodying a program of machine-readable instructions executed by a digital processing apparatus to perform operations for collecting dump data, the operations comprising:
    receiving an on demand data (ODD) dump request from a host to transfer dump data from a storage controller memory of a storage controller distinct from the host, wherein the storage controller comprises at least two components and the ODD dump request comprises a component priority for each component;
    pausing at least one scan loop performed by the storage controller on the storage controller memory;
    allocating free buffer space within an ODD dump buffer space for each component according to the component priority by determining a component buffer space minimum and component buffer space maximum for each component, wherein the component buffer space minimum comprises previously allocated buffer space and the component buffer space maximum is less than all free buffer space;
    transferring the dump data from the storage controller memory to the ODD dump buffer space according to the component priority;
    upon transferring the dump data for a first component, dynamically allocating free buffer space from the first component with a higher priority to a second component with a lower priority;
    unpausing the at least one scan loop in response to the transfer of the dump data to the ODD dump buffer space; and
    offloading the dump data from the ODD dump buffer space to a data storage device distinct from the host and the storage controller.

11. The computer readable medium of claim 10, wherein pausing the at least one scan loop comprises pausing a first scan loop, initiating a scan loop pause timer, attempting to pause any remaining scan loops before expiration of the scan loop pause timer, and unpausing all scan loops if all scan loops are not paused before expiration of the scan loop pause timer.

12. The computer readable medium of claim 11, wherein pausing the at least one scan loop further comprises reattempting to pause all scan loops and reinitiating the scan loop pause timer upon expiration of a rest timer.

13. The computer readable medium of claim 10, further comprising prioritizing the dump data prior to transferring the dump data to the ODD dump buffer space.

14. The computer readable medium of claim 13, further comprising real-time registering and deregistering of perspective dump data to facilitate a proper prioritization.

15. The computer readable medium of claim 10, further comprising balancing the dump data amongst multiple processing threads configured to simultaneously transfer the dump data to distinct segments of the ODD dump buffer space.

16. The computer readable medium of claim 10, wherein transferring the dump data to the ODD dump buffer space comprises transferring the dump data to the ODD dump buffer space until expiration of a dump data transfer timer.

17. The computer readable medium of claim 16, further comprising restarting the at least one scan loop to normal processing in spite of an incomplete data dump.

18. The computer readable medium of claim 10, further comprising scheduling an offload of the dump data from the ODD dump buffer space to storage.

19. A method for collecting dump data, the operations comprising:
   receiving, by use of a processor, an on demand data (ODD) dump request from a host to transfer dump data from a storage controller memory of a storage controller distinct from the host, wherein the storage controller comprises at least two components and the ODD dump request comprises a component priority for each component;
   pausing at least one scan loop performed by the storage controller on the storage controller memory;
   allocating free buffer space within an ODD dump buffer space for each component according to the component priority by determining a component buffer space minimum and a component buffer space maximum for each component, wherein the component buffer space minimum comprises previously allocated buffer space and the component buffer space maximum is less than all free buffer space;
   transferring the dump data from the storage controller memory to the ODD dump buffer space according to the component priority;
   upon transferring the dump data for a first component, dynamically allocating free buffer space from the first component with a higher priority to a second component with a lower priority;
   unpausing the at least one scan loop in response to the transfer of the dump data to the ODD dump buffer space; and
   offloading the dump data from the ODD dump buffer space to a data storage device distinct from the host and the storage controller.

20. A system for collecting dump data, the system comprising:
   a plurality of host computers configured to communicate with at least one storage controller; and
   at least one storage device configured to store data on a data bearing medium;
   the at least one storage controller configured to:
   receive an on demand data (ODD) dump request from a host to transfer dump data from a storage controller memory of a storage controller distinct from the host, wherein the storage controller comprises at least two components and the ODD dump request comprises a component priority for each component;
   pause at least one scan loop performed by the storage controller on the storage controller memory;
   allocate free buffer space within an ODD dump buffer space for each component according to the component priority by determining a component buffer space minimum and a component buffer space maximum for each component, wherein the component buffer space minimum comprises previously allocated buffer space and the component buffer space maximum is less than all free buffer space;
   transfer the dump data from the storage controller memory to the ODD dump buffer space according to the component priority;
   upon transferring the dump data for a first component, dynamically allocating free buffer space form the first component with a higher priority to a second component with a lower priority
   unpause the at least one scan loop in response to the transfer of the dump data to the ODD dump buffer space; and
   offload the dump data from the ODD dump buffer space to the storage device, wherein the storage device is distinct from the host and the storage controller.

* * * * *